W. S. MIX.
TAG.
APPLICATION FILED MAR. 31, 1921.
1,387,657.
Patented Aug. 16, 1921.
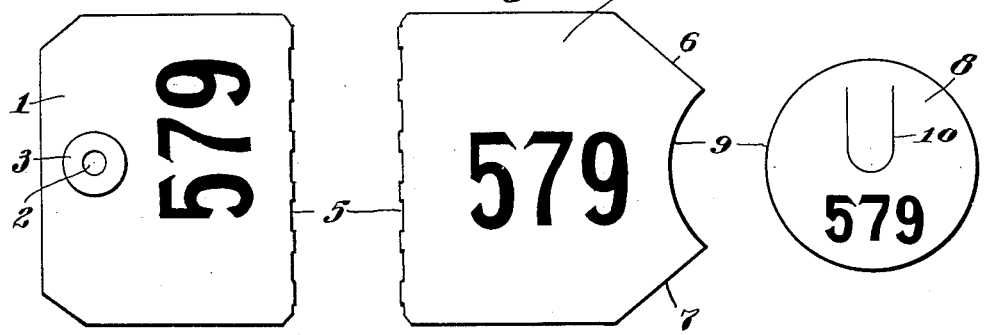
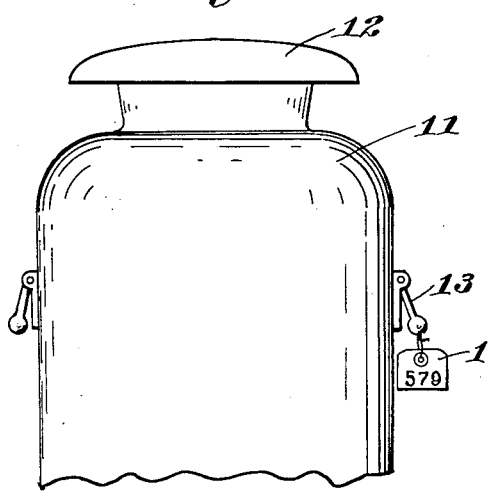
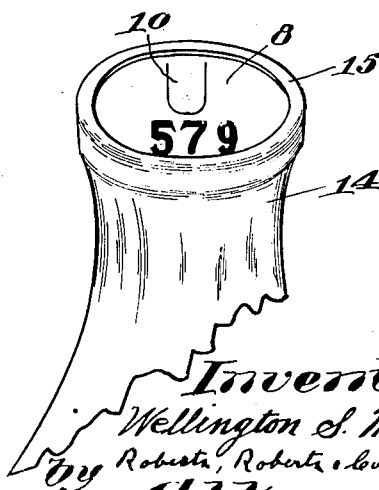
Inventor
Wellington S. Mix.
by Roberts, Roberts & Cushman
his Attorneys

UNITED STATES PATENT OFFICE.

WELLINGTON S. MIX, OF CHICAGO, ILLINOIS, ASSIGNOR TO DENNISON MANUFACTURING COMPANY, OF FRAMINGHAM, MASSACHUSETTS, A CORPORATION OF MASSACHUSETTS.

TAG.

1,387,657.  Specification of Letters Patent.  Patented Aug. 16, 1921.

Application filed March 31, 1921. Serial No. 457,559.

*To all whom it may concern:*

Be it known that I, WELLINGTON S. MIX, a citizen of the United States of America, and resident of Chicago, in the county of Cook and State of Illinois, have invented new and useful Improvements in Tags, of which the following is a specification.

This invention relates to tags and more particularly to a tag especially useful in connection with the handling of milk, cream, etc.

In the shipping of milk or cream to creameries, and similar establishments, it is usual for the farmer to employ large cans or containers. These containers, when received at the creamery, are weighed and a sample bottle is then filled with the milk or cream from the container and sent to the laboratory to be graded for butter fat, in accordance with which grading the consignor is paid. Following the usual practice, it is customary to tie a numbered tag to the container when received, and to make record of such number, together with the corresponding weight and the consignor's name and at the same time to make out a second tag with a corresponding number (and consignor's name if desired) to be tied around the neck of the sample bottle.

This mode of keeping the records and of identifying the sample is cumbersome, time-consuming and subject to inaccuracies frequently resulting in disputes as to the amount of pay due the consignor, while furthermore, the sample bottle either remains uncovered and subject to bacterial contamination or necessitates the further operation of obtaining and applying a cover thereto. The present invention has for its object the provision of means whereby the defects and inaccuracies in the present system of keeping records of milk shipments as above outlined may be overcome, while at the same time a ready means for closing the sample bottle is provided.

As one mode of attaining the desired object the device disclosed in the accompanying drawings may be employed and in which—

Figure 1 is a plan view of a tag constructed in accordance with the present invention, illustrating the same as ready for use.

Fig. 2 is a view of the same tag with its parts separated.

Fig. 3 is a fragmentary side elevation of a shipping container such as is commonly used in the transportation of milk in bulk, showing a portion of the tag as attached thereto; and Fig. 4 is a fragmentary view illustrating a milk bottle of commercial form having a second portion of the tag applied thereto to form a cap for the same.

Referring to the drawings the numeral 1 indicates the attaching portion of the tag having a perforation 2 therein surrounding which, may be a reinforcing washer or patch 3 of usual form. This portion of the tag with its perforation is intended to be secured to a shipping container by the use of a string in the usual manner. Detachably connected to the portion 1 of the tag is the intermediate portion 4 which may be referred to as the recording portion, the portions 1 and 4 being readily separable by means of a line of perforations or indentations 5. That end of the portion 4 opposite its connection to the portion 1 is preferably tapered, providing the converging edges 6, 7 and terminates in a portion 8 of substantially circular form. A line of perforations or indentations 9 of curved or arcuate form defines the limits of the portions 4 and 8. If desired the portion 8 may be provided with a flap 10 in a manner common to ordinary milk bottle stoppers and providing for the ready removal of such stoppers from the bottles to which they are applied. The several portions of the tag as thus formed may be separated as indicated in Fig. 2, the portion 8 when thus separated being of circular form and of a size to fit the top of the usual commercial milk bottle for forming a cap or closure therefore.

Each portion of the tag as thus formed is provided with similar identifying characters and the portion 4 of the tag may be of a sufficient size to provide space for the entry thereon of such data as it may be desired to record in connection with the shipment.

In Fig. 3 there is illustrated a shipping container 11 such as is commonly employed for shipping milk in bulk from the farms to the creameries or similar establishments, such container having a cover 12 and handle such as 13. In Fig. 4 is represented the upper part of a milk bottle 14 of ordinary commercial form having a flange top 15 with which is adapted to coöperate a disk cap in the usual manner.

In the employment of the tag herein described, it being assumed that the container 11 has been received at the creamery, the container will be weighed and a tag of the type herein disclosed will be attached thereto conveniently by tying the member 1 to the handle of the container. The weight of the container, together with the name of the consignor if desired, may now be entered on the record portion of the tag, the latter being torn off from the portion 1. A bottle such as 14 is filled with milk or cream from the container and the portion 8 of the tag is then detached from the portion 4 and placed in the bottle top to form a stopper therefor. The record portion 4 of the tag is then sent to the bookkeeper or other designated person who may enter such record portion in a card index if desired, or transfer the data contained thereon to any suitable form of record. The bottle 14 is sent to the testing laboratory where it is tested for butter fat content, the results of such tests being entered upon the cap 8 received with the bottle. Such cap with its identifying number or character is then returned to the bookkeeping department, whereby means of the identifying number which it bears, the corresponding record may readily be found and the consignor credited with the proper weight of milk of a certain butter fat content.

By the employment of the three-part tag thus provided, it is evident that there is little or no possibility of mistake in identification of the sample, while at the same time the cap forming member forming a portion of the tag which is secured to the shipping container is readily available for placing upon the top of the sampling bottle when the latter is filled. Moreover by providing the part 8 in the form of a bottle cap it is unnecessary to tie a tag about the bottle neck as heretofore has been the usual practice and thus the operation is facilitated with a saving of time to the employees of the creamery together with lessened liability of confusion and error.

While the tag hereinbefore described is of especial value for use in the handling of milk at creameries and like establishments, it is clearly evident that a tag of similar character might well be found useful under other circumstances and in particular wherever it is desired to obtain a sample for testing from a quantity of material in bulk. In such connection furthermore, it is to be noted, while as herein shown that portion of the tag which is adapted to form a closure for a sample container is of circular form, it might well be of other forms in accordance with the particular type of container to which it would be applied, it being sufficient so far as the present invention is concerned that such closure member constitutes a detachable part of the tag structure.

Having thus described the invention in a preferred embodiment of the same together with the mode of use thereof, what I claim and desire to secure by Letters Patent of the United States is:

1. A tag comprising separable portions formed from a single piece of material, one of said portions when separated adapted to form a receptacle closure.

2. A tag comprising separable portions formed from a single piece of material, one of said portions when separated adapted to form a receptacle closure and each portion bearing identical identifying indicia.

3. A tag comprising a member having an aperture, a substantially circular end member and an intermediate member, said members being separably connected, said end member when separated being adapted to form a receptacle cover.

4. A tag comprising a member having an aperture, an intermediate member separably connected to said apertured member and having a tapering end, an end member of substantially circular form, and a weakened curved portion connecting said end member to said intermediate member at its tapered end.

5. A tag comprising a portion having a perforation for attachment to an article, a detachable portion adapted to receive a record, and a detachable circular portion constructed and arranged to form a receptacle closure.

6. A tag comprising a portion having a perforation for fastening means whereby to attach it to a container, a detachable portion provided with a space for the entry of a record, and a detachable portion of substantially circular form constructed and arranged to form a receptacle closure.

Signed by me at Chicago, Illinois, this 22nd day of March, 1921.

WELLINGTON S. MIX.